SYNTHESIS OF UREA
Original Filed Feb. 4, 1963
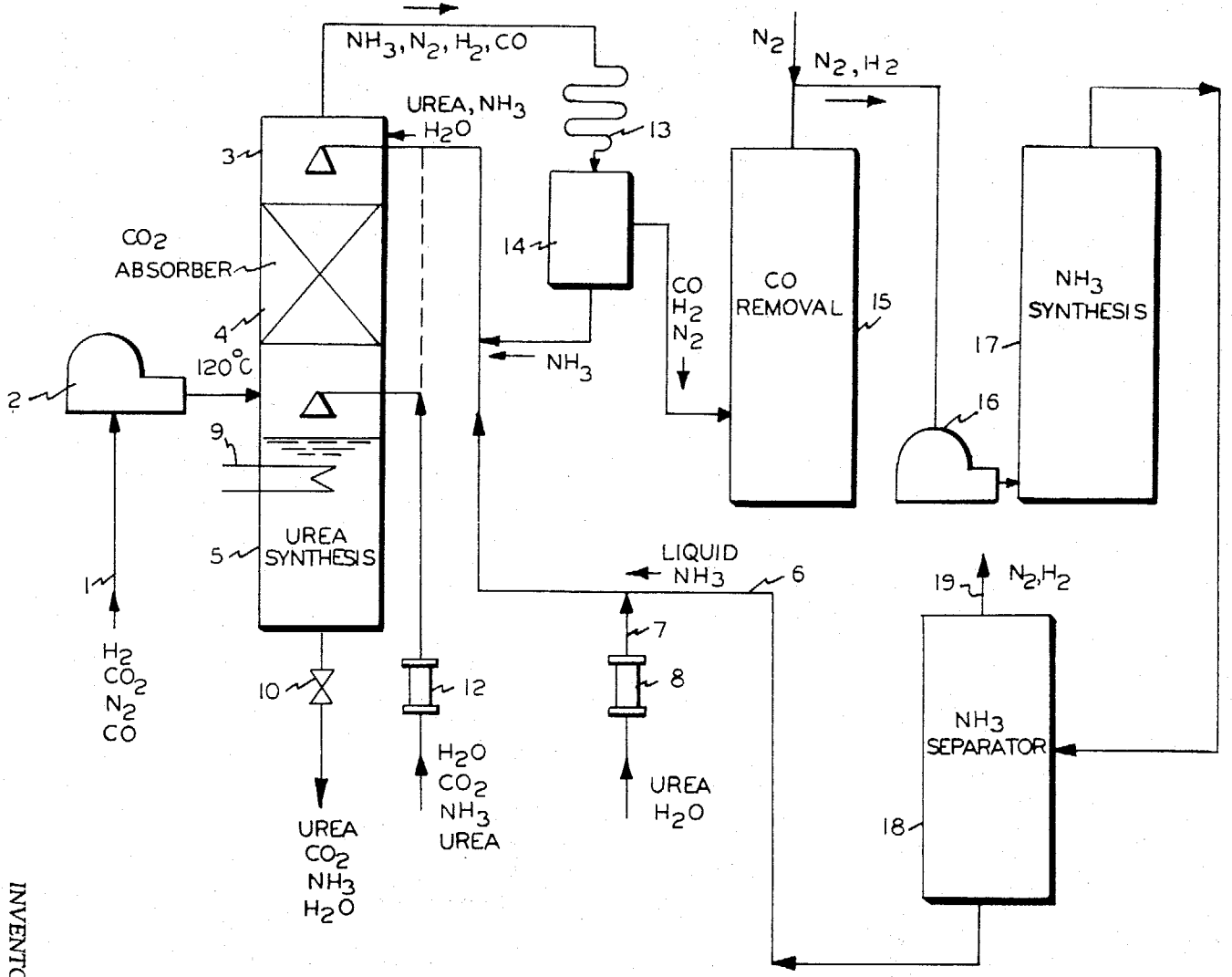
INVENTORS
EIJI OTSUKA
TOYOYASU SAIDA
BY Fisher, Christen, Sabol & Caldwell
ATTORNEYS United States Patent Office Re. 27,377
Reissued May 30, 1972

27,377
SYNTHESIS OF UREA

Eiji Otsuka, Fujisawa, and Toyoyasu Saida, Omiya, Japan, assignors to Mitsui Toatsu Chemicals Incorporated Original No. 3,303,215, dated Feb. 7, 1967, Ser. No. 256,035, Feb. 4, 1963. Application for reissue Mar. 20, 1968, Ser. No. 719,784
Claims priority, application Japan, Mar. 9, 1962, 37/8,558
Int. Cl. C07c *127/00*
U.S. Cl. 260—555 A 11 Claims

Matter enclosed in heavy brackets [ ] appears in the original patent but forms no part of this reissue specification; matter printed in italics indicates the additions made by reissue.

*ABSTRACT OF THE DISCLOSURE*

*A process for making urea wherein carbon dioxide is removed from a raw material gas containing $N_2$, $H_2$ and $CO_2$ by reacting it with ammonia to produce urea and a combined process for making urea and ammonia wherein the above-mentioned process is carried out and the resulting raw material gas containing $N_2$ and $H_2$ is subjected to ammonia synthesis conditions to form ammonia.*

This invention relates to a novel method of synthesizing urea in the usual process for synthesizing ammonia from a raw material gas containing $N_2$, $H_2$ and $CO_2$. More particularly, the invention relates to a method of synthesizing urea wherein an ammonia synthesis process and the urea synthesis process are effectively combined with each other by reacting carbon dioxide in said raw material gas with ammonia produced in the ammonia synthesis process and thereby separating it as urea from the raw material gas.

Urea is conventionally synthesized at a high temperature and pressure by reacting liquid ammonia with liquid carbon dioxide. Liquid ammonia is synthesized from hydrogen and nitrogen obtained by purifying an ammonia synthesizing raw material gas produced by partial oxidation by air of a carbonaceous raw material or a hydrocarbon. Liquid carbon dioxide is obtained by washing the ammonia synthesizing raw material gas and absorbing carbon dioxide contained therein with a solvent selected from water, aqueous ammonia solution, an aqueous solution of a caustic alkali or ethanol amine under pressure, discharging the absorbed carbon dioxide by decreasing the pressure of the resulting absorbate or by heating the resulting absorbate, and compressing and liquefying the discharged carbon dioxide. Thus, the series of steps from the preparation of the raw material gas for synthesizing ammonia to the synthesis of urea were complicated and the manufacturing cost of urea has been high.

It is therefore an object of this invention to provide a novel, simple, inexpensive process for the manufacture of urea.

Another object is the provision of a novel process for manufacturing urea employing fewer steps than heretofore employed.

Another object of the present invention is to provide a novel method of synthesizing urea which can be used in a conventional process for synthesizing ammonia.

Other objects and advantages will be readily apparent from the following description.

The present invention is a method of synthesizing urea comprising the steps of compressing to a urea synthesizing pressure an ammonia synthesizing raw material gas containing carbon dioxide as conventionally prepared in an ammonia synthesizing process, bringing the compressed raw material gas into contact with an absorbent containing liquid ammonia mixed with a medium capable of dissolving ammonium carbamate to absorb in said absorbent substantially all carbon dioxide contained by said raw material gas and keeping the temperature of the resulting absorbate at a urea synthesizing temperature.

The above-mentioned urea synthesizing pressure can be varied depending on the mol ratio of ammonia to carbon dioxide but is in general above about 150 kg./cm.$^2$ gauge and preferably at 200 to 300 kg./cm.$^2$ gauge. The urea synthesizing temperature is not narrowly critical and preferably is about 160 to about 200° C. The temperature of said absorbent when brought into contact with the raw material gas can vary over a wide range, e.g., 10° C. to 100° C. The temperature of said raw material gas when contacted with said absorbent can vary over a wide range, e.g., 100° C. to 150° C.

The medium capable of dissolving ammonium carbamate used in the absorbent is selected from water, aqueous ammonia solution or an aqueous solution of urea. Further, such substances as, for example, methanol can be used as solvents for ammonium carbamate. Small amounts of other materials, e.g., carbon dioxide, may be present in said absorbent.

The urea synthesis reactor used in the present invention can be equivalent to a carbon dioxide scrubbing column employed in a conventional ammonia synthesis process. The upper part of the column is a carbon dioxide absorbing zone having such fillers as Raschig rings or cap trays to provide better contact of the absorbent with the raw material gas. Needless to say, some urea synthesis reaction occurs even in the carbon dioxide absorbing zone. The lower part of the column is a urea synthesis zone which is a reservoir for retaining the solution from the carbon dioxide absorbing zone for a time sufficient to complete the urea synthesis reaction. A preheater may be set in the upper part of the urea synthesis zone so that the solution from carbon dioxide absorbing zone may be kept at the urea synthesis temperature as required.

A sufficient amount of the absorbent is flowed from the top part of the carbon dioxide absorbing zone in the urea synthesis reactor and the absorbing zone preferably is made high enough to prevent any carbon dioxide from passing through said zone. A small amount of ammonia accompanies the outlet gas from the carbon dioxide absorbing zone. It is therefore separated as liquid $NH_3$ by cooling and is circulated to the carbon dioxide absorbing zone.

Thereafter carbon monoxide is preferably removed. Scrubbing with a cuprous salt-ammonium salt-ammonia aqueous solution is especially adapted to remove carbon monoxide from the raw material gas from which carbon dioxide has been removed, and, therefore, a slight amount of ammonia may safely accompany the gas introduced into the carbon monoxide removal step. However, other methods for removing CO such as, for example, the formation of methanol by the reaction of CO with hydrogen in said gas or by liquid nitrogen washing can be employed, although it is necessary to completely remove the slightest amount of ammonia in said gas. The gas from which $CO_2$, $NH_3$ and CO have been depleted is then sent to the ammonia synthesis reactor wherein ammonia is produced in the usual manner.

The effluent taken out of the bottom part of the urea synthesis zone of the reactor is treated by any known process to recover urea. The unreacted ammonia and carbon dioxide are recovered and circulated to the top part of the urea synthesis zone, as desired.

FIGURE 1 is a diagrammatic flow chart illustrating a specific embodiment of the process of the present invention.

Referring to FIGURE 1, an ammonia synthesizing raw naterial gas (wherein most of the original contained car-ion monoxide has been converted into hydrogen and :arbon dioxide) is fed by pipe 1 to a compressor 2 where t is compressed to such urea synthesizing pressure as, for :xample, 200 to 300 kg./cm.$^2$ gauge. The compressed ;as then is introduced into the lower part of a carbon lioxide absorbing zone 4 in a urea synthesis reactor 3. nto the top part of the carbon dioxide absorbing zone 4 s introduced a mixture of liquid ammonia added through ›ipe 6 and a medium dissolving ammonium carbamate ıdded through pipe 7. The liquid ammonia introduced hrough the pipe 6 can be ammonia obtained in the proc-:ss of ammonia synthesis and decompressed to the urea ynthesizing pressure. The medium dissolving ammoni-ım carbamate is compressed by means of a plunger pump to the urea synthesizing pressure and introduced into he carbon dioxide absorbing zone.

The solution coming down from the carbon dioxide bsorbing zone is converted to urea in the urea synthesis one 5. In case the temperature of the liquid entering he urea synthesis zone is not sufficiently high, the liquid hould be heated to the desired urea synthesis tempera-ıre with a preheater 9. The liquid which has entered he urea synthesis zone produces urea and discharges gases ther than $CO_2$ absorbed therein while gradually descend-ıg. The resulting liquid effluent from the bottom of reac-›r 3 is treated to recover urea by passing said effluent › unreacted ammonia and carbon dioxide separating and ecovering steps (e.g., distillation) through a discharge alve 10. The urea remaining in said effluent after removal f $CO_2$ and $NH_3$ can then be recovered by any suit-ble means, e.g., crystallization. If desired, the recov-red unreacted ammonia and carbon dioxide can be irculated to the urea synthesis reactor and reused. The olution which has absorbed them in the above-mentioned :parating and recovering steps can be introduced into ıe top part of the urea synthesis zone 5 by means of a lunger pump 12 through a pipe 11. However, in some ases, all or part of this recovered solution may be irculated to the top of the carbon dioxide absorbing one 4.

The small amount of ammonia accompanying the $CO_2$-epleted, raw material gas, which has come out of the arbon dioxide absorbing zone 4, is recovered by passing ıe gas through a cooler 13 and a separator 14 and is irculated back to the carbon dioxide absorbing zone. hen the raw material gas is introduced into a carbon ıonoxide removing device 15 to remove the contained arbon monoxide and adjust the mol ratio of hydrogen › nitrogen for $NH_3$ synthesis, is compressed to an mmonia synthesizing pressure, for example 400 to 500 g./cm.$^2$ gauge, by means of a compressor 16, and is ıtroduced into an ammonia synthesis reactor 17 so as › form ammonia. Thence, the synthesized ammonia is :parated from the unreacted hydrogen and nitrogen in n ammonia separator 18, is decompressed to any desired ressure and is sent to the carbon dioxide absorbing zone ı the urea synthesis reactor 3 through the pipe 6. On ıe other hand, the unreacted hydrogen and nitrogen are :nt back to the ammonia synthesis reactor 17 through pipe 19.

In case the amount of the carbon dioxide in the raw ıaterial gas for synthesizing ammonia is smaller than ıe stoichiometric equivalent for reaction with the amount f ammonia obtained from the ammonia synthesizing step ›r synthesizing urea, additional carbon dioxide may be lded from any other source or the excess ammonia may : taken out of the system, e.g., out of the unreacted nmonia and carbon dioxide recovering step following :moval of effluent from the urea synthesis zone 5. In ıse the amount of carbon dioxide contained in the raw ıaterial gas is larger than the stoichiometric equivalent ›rresponding to the amount of ammonia obtained from ıe ammonia synthesizing step, the excess carbon dioxide may be removed before entering the urea synthesis reactor 3 or may be taken out of the unreacted ammonia and carbon dioxide recovering step.

As described above, according to the present invention, there is no need of producing liquid carbon dioxide by separating carbon dioxide from the raw material gas used in synthesizing ammonia as in the conventional process but urea can be produced simultaneously with the removal of carbon dioxide from said raw material gas. Therefore, there is no need for equipment for removing and regenerating carbon dioxide and for producing liquid carbon dioxide as required in the prior art processes of synthesizing ammonia. There is also no need for special pumps for feeding liquid ammonia and liquid carbon dioxide to a urea reactor. As a result, the manufacturing cost of urea has been remarkably reduced and the need for special equipment has been eliminated by the present invention.

The following examples are presented wherein all percentages are by weight and all pressures are by gauge unless otherwise specified.

Example 1

Referring to FIG. 1, 334.5 m.$^3$ per hour (at normal temperature and pressure) of an ammonia synthesizing raw material gas composed of 72.1 volume percent $H_2$, 24.2 volume percent $CO_2$, 3.6 volume percent CO, 0.1 volume percent $N_2$ and 0.1 volume percent $CH_4$ from a carbon monoxide converting furnace in an ammonia factory were compressed to 250 kg./cm.$^2$ and were introduced into the lower part of the carbon dioxide absorbing zone 4 of a urea synthesis reactor 3 having a daily production rate of 5 tons of urea.

A washing solution composed of 79 kg. of urea, 348 kg. of $NH_3$ and 37 kg. of $H_2O$ per hour was introduced into the top part of a carbon dioxide absorbing zone 4. Carbon dioxide in the raw material gas was completely absorbed in the washing solution at the rate of 158 kg./hr. by the countercurrent of said solution against the gas in the carbon dioxide absorbing zone 4 and the resulting absorbate was continuously introduced into a urea synthesizing zone 5. In this washing step, the temperature in the upper part of the carbon dioxide absorbing zone 4 was kept at 40° C. and that in the lower part at 120° C.

The gas leaving the top part of the carbon dioxide absorbing zone 4 was sent to the ammonia synthesizing apparatus 17 via cooler 13, separator 14, CO removing device 15 and compressor 16 to synthesize ammonia. Liquid ammonia at 121 kg./hr. corresponding to the amount of ammonia synthesized from the above-mentioned raw material gas was returned to the carbon dioxide absorbing zone 4 through pipe 6. This liquid ammonia, prior to introduction into the absorbing zone 4, was mixed with recovered ammonia which was in the amount of 227 kg./hr. obtained from the unreacted ammonia and carbon dioxide recovering step and the mother liquor at 117 kg./hr. from urea crystallizing step. The resulting mixture was kept at 40° C. and was used as the absorbent for $CO_2$ in the raw material gas in the carbon dioxide absorbing zone 4.

In the urea synthesizing zone in the urea synthesis reactor, the recovered solution from unreacted ammonia and carbon dioxide recovering step and composed of 63 kg. of urea, 244 kg. of $NH_3$, 210 kg. of $CO_2$ and 142 kg. of $H_2O$ per hour was mixed with the absorbate obtained from the carbon dioxide absorbing zone and composed of 79 kg. of urea, 344 kg. of $NH_3$, 158 kg. of $CO_2$ and 37 kg. of $H_2O$ per hour and the temperature of the mixture was maintained at 180° C. to convert ammonium carbamate into urea.

The urea synthesis effluent coming out of the urea synthesizing zone 5 through discharge valve 10 was composed of 350 kg. of urea, 470 kg. of $NH_3$, 210 kg. of $CO_2$ and 242 kg. of $H_2O$ per hour. This effluent was subjected to high pressure distillation at a pressure of 18 kg./cm.$^2$ and a temperature of 150° C. to distill off a greater portion of the unreacted ammonia and carbon dioxide, and then was subjected to low pressure distillation at a pressure of 2 kg./cm.$^2$ and a temperature of 130° C. to distill off the remaining portion of unreacted ammonia and carbon dioxide. The urea solution from the low pressure distillation was subjected to crystallization to obtain 208 kg. per hour of crystal urea and 210 kg. per hour of mother liquor (containing 68 percent urea). Ninety-three kg. per hour of the mother liquor was introduced into a low pressure absorption column wherein the unreacted ammonia and carbon dioxide distilled off in the low pressure distillation was absorbed to obtain an absorbate, and then the absorbate was introduced into a high pressure absorption column wherein the unreacted ammonia and carbon dioxide distilled off in the high pressure distillation was absorbed at the pressure of 18 kg./cm.$^2$. Thereby there was obtained 659 kg. per hour of a recovered solution composed of 9.5 percent urea, 37.0 percent $NH_3$, 32.0 percent $CO_2$ and 21.5 percent $H_2O$. Excess ammonia coming from the high pressure absorption column was cooled through an ammonia condenser to recover liquid ammonia at the rate of 227 kg. per hour. The remaining portion of the mother liquor (117 kg. per hour) was compressed by pump 8, sent via pipe 7 for mixture with liquid ammonia and thence was sent to the $CO_2$ absorbing zone 4.

The recovered solution from the high pressure absorption column was compressed and circulated to the top of urea synthesizing zone 5. The recovered liquid ammonia was recycled along with the remaining mother liquor for mixture with liquid ammonia obtained from the ammonia synthesizing step and introduction into the top part of the carbon dioxide absorbing zone 4 so as to be used as the absorbent for carbon dioxide in the raw material gas for synthesizing ammonia.

Example 2

Referring to FIG. 1, 334.5 m.$^3$ per hour (at normal temperature and pressure) of an ammonia synthesizing raw material gas composed of 72.1 volume percent $H_2$, 24.2 volume percent $CO_2$, 3.6 volume percent CO, 0.1 volume percent $N_2$ and 0.1 volume percent $CH_4$ from a carbon monoxide converting furnace in an ammonia synthesis plant, was compressed to 250 kg./cm.$^2$ and was introduced into the lower part of the carbon dioxide absorbing zone 4 of a urea synthesis reactor 3 having a daily production rate of 5 tons of urea.

A washing solution composed of 6.9 percent urea, 60.5 percent $NH_3$, 19.0 percent $CO_2$ and 13.8 percent $H_2O$ was flowed at 725 kg./hr. from the top part of a carbon dioxide absorbing zone in the urea synthesis reactor. $CO_2$ in the raw material gas was completely absorbed at 81 m.$^3$/hr. (N.T.P.) by the countercurrent of the solution against said gas in the carbon dioxide absorbing zone 4 and the resulting absorbate was introduced into the urea synthesizing zone 5. The temperature of the absorbate was kept at 180° C. to convert the ammonium carbamate in the absorbate into urea. In the above washing step, the temperature in the upper part of the carbon dioxide absorbing zone 4 was kept at 70° C. and that in the lower part at 150° C.

The gas leaving the top part of the carbon dioxide absorbing zone 4 was cooled to 40° C. $NH_3$ saturated in the gas was recovered at 10 kg./hr. and thereafter the gas was sent to the ammonia synthesis apparatus 17 via cooler 13, separator 14, CO removal device 15 and compressor 16. $NH_3$ at 121 kg./hr., the amount of ammonia synthesized from the above-mentioned raw material gas, was returned to carbon dioxide absorbing zone 4 through pipe 6. This liquid ammonia, prior to introduction into zone 4, was mixed with recovered ammonia at 129 kg./hr. obtained from the unreacted ammonia and carbon dioxide recovering step and with 476 kg./hr. of a recovered solution containing 50 kg. urea, 188 kg. $NH_3$, 138 kg. $CO_2$ and 100 kg. $H_2O$. The resulting mixture was cooled to 70° C. and was used as the absorbent for $CO_2$ in the raw material gas in the carbon dioxide absorbing zone 4.

The urea synthesis effluent leaving the urea synthesis zone 5 was composed of 262 kg. of urea, 312 kg. of $NH_3$, 129 kg. of $CO_2$ and 166 kg. of $H_2O$ per hour. This effluent was subjected to high pressure distillation at a pressure of 15 kg./cm.$^2$ and a temperature of 145° C. to distill off the greater portion of unreacted ammonia and carbon dioxide, and then was subjected to low pressure distillation at a pressure of 0.5 kg./cm.$^2$ and a temperature of 125° C. to distill off the remaining portion of the unreacted ammonia and carbon dioxide leaving an aqueous urea solution. The urea solution after low pressure distillation was subjected to crystallization to obtain per hour 208 kg. of crystal urea and 74 kg. of a mother liquor (containing 68 percent urea). The mother liquor was introduced into a low pressure absorption column wherein the unreacted ammonia and carbon dioxide distilled off in the low pressure distillation was absorbed at a pressure of 0.5 kg./cm.$^2$ to obtain an absorbate, which was then introduced into a high pressure absorption column wherein the unreacted ammonia and carbon dioxide distilled off in the high pressure distillation was absorbed at the pressure of 15 kg./cm.$^2$, thereby there was obtained per hour 476 kg. of a recovered solution composed of 10.5 percent urea, 39.4 percent $NH_3$, 29.0 percent $CO_2$ and 21.1 percent $H_2O$. Excess ammonia from the high pressure absorption column was cooled in ammonia condenser to recover 129 kg. per hour of liquid ammonia.

The recovered solution and recovered liquid ammonia were compressed to 285 kg./cm.$^2$ by means of plunger pump 8 and were mixed with the liquid ammonia obtained in the ammonia synthesis step. The mixture was used as the absorbent in carbon dioxide absorbing zone 4.

The process of this invention can be employed with any raw material gas containing $CO_2$, for example, gases containing 15 to 35 volume percent $CO_2$, 65 to 85 volume percent $H_2$, 0 to 20 volume percent $N_2$, 0 to 5 volume percent CO, 0 to 2 volume percent other gases e.g., $CH_4$. The medium capable of dissolving ammonium carbonate used in the adsorbent can contain 0 to 50 weight percent ammonia and/or 0 to 70 weight percent urea. The concentration of unreacted $CO_2$, unreacted $NH_3$ and urea in the aqueous solution recycled from the urea recovery step to the top of the urea synthesis zone or to the top of the $CO_2$ absorber, if such a recycle is used, respectively preferably lie in the range of 25 to 35 weight percent, 33 to 43 weight percent and 5 to 10 weight percent. The time allowed for the absorbate to pass through the urea synthesis zone generally varies with the temperatures employed and preferably ranges from 15 minutes at the higher temperatures to 60 minutes at the lower temperatures. Of course, all of the $CO_2$ and $NH_3$ contained in the absorbate need not be inter-reacted and, in fact it is preferable in the interests of speed to react only a portion of the contained $CO_2$ and $NH_3$ and recycle the unreacted portions. The ammonia synthesis from $N_2$ and $H_2$ is carried out in any suitable manner, many of which are well known. The molar ratio of $N_2$ and $H_2$ introduced into the ammonia synthesis reactor is also adjusted as desired in any suitable manner to permit the synthesis of ammonia by the method chosen.

What is claimed is:

1. In the method of synthesizing urea by reacting $CO_2$ and $NH_3$ wherein a raw material gas containing $CO_2$, $H_2$ and $N_2$ is treated to separate the $CO_2$ and is thereafter treated to react $H_2$ and $N_2$ to form the $NH_3$, that improvement comprising compressing said raw material gas to a pressure of at least 150 kg./cm.$^2$, washing said gas with a mixture of ammonia and a medium capable of dissolving ammonium carbamate to absorb in said mixture the $CO_2$ contained by said gas thereby forming n absorbate, and maintaining said absorbate at a urea ynthesizing temperature to form urea.

2. The improvement as claimed in claim 1 wherein aid medium is selected from the class consisting of water, queous ammonia solutions, aqueous urea solutions and ıixtures thereof.

3. A method of synthesizing urea comprising comressing a gas containing $CO_2$ to a pressure of at least 50 kg./cm.$^2$, washing said gas with a mixture of amıonia and a medium capable of dissolving ammonium arbamate to absorb in said mixture the $CO_2$ contained ı said gas thereby forming an absorbate and reacting the $CO_2$ and $NH_3$ contained in said absorbate to form urea nd water.

4. The method as claimed in claim 3 wherein said ıedium is selected from the class consisting of water, queous ammonia solutions, aqueous urea solutions and ıixtures thereof.

5. A method of synthesizing urea as claimed in claim 3 'herein a portion of said urea is removed from said wa- ɜr and the remainder being dissolved in said water as n aqueous solution of urea is employed as said medium ı said washing step.

6. A method as claimed in claim 3 wherein said abɔrbate after reacting $CO_2$ and $NH_3$ therein to form urea nd water contains in addition unreacted $CO_2$ and $NH_3$, portion of said urea is separated from said water leavıg an aqueous urea solution; a portion of said aqueous rea solution is employed as said medium in the washıg step; and the unreacted $CO_2$ and $NH_3$ are dissolved ı the remaining portion of said aqueous urea solution 'hich is added to said absorbate prior to the reacting ɛp.

7. A method of synthesizing urea comprising comressing a gas containing $CO_2$ to a pressure of at least 50 kg./cm.$^2$, washing said gas with a mixture of amıonia and a medium selected from the class consisting f water, aqueous ammonia solutions, aqueous urea soıtions, and mixtures thereof, to absorb in said mixture ıe $CO_2$ contained in said gas thereby forming an abɔrbate, reacting the $CO_2$ and $NH_3$ contained in said abɔrbate to form a mixture of urea, water, unreacted $CO_2$ nd unreacted $NH_3$, recovering a portion of said urea, ıe remainder of said urea being dissolved in said water s an aqueous urea solution, employing a portion of said queous urea solution as said medium in said washing ɛp, dissolving said unreacted $CO_2$ and $NH_3$ in the reıaining portion of said aqueous urea solution, and addıg the resulting solution containing said unreacted $CO_2$ nd $NH_3$ and said remaining portion of said aqueous urea ɔlution to said absorbate prior to said reacting step.

8. A method of synthesizing urea comprising comressing a gas containing $CO_2$, $N_2$, $H_2$ and CO to a presıre of at least 150 kg./cm.$^2$, washing said gas with a ıixture of ammonia and an aqueous solution containing nmonia and urea, to absorb in said mixture the $CO_2$ ɔntained in said gas thereby forming an absorbate, reɛting the $CO_2$ and $NH_3$ contained in said absorbate to ɔrm urea and water mixed with unreacted $CO_2$ and $NH_3$, ɛcovering a portion of said urea and leaving the remainıg urea dissolved in said water as an aqueous urea soluon, recycling a portion of said aqueous urea solution to ıid washing step, dissolving said unreacted $CO_2$ and $H_3$ in the remaining portion of said aqueous urea soluon and adding the resulting solution containing said unɛacted $CO_2$ and $NH_3$ and said remaining portion of ıid aqueous urea solution to said absorbate prior to said ɛacting step, removing CO from said gas after removal ɛ said $CO_2$ by said washing step, thereafter reacting $N_2$ ıd $H_2$ contained in said gas to form ammonia, and reɛcling said formed ammonia to said washing step.

*9. In an ammonia synthesis process in which a hydroırbon is converted to produce a crude gas mixture princiılly containing hydrogen, nitrogen and carbon monoxide, ıe carbon monoxide in the crude gas mixture is converted to produce further hydrogen and carbon dioxide, thereby forming a final gas mixture principally containing hydrogen, nitrogen and carbon dioxide, the final gas mixture is processed to remove carbon dioxide, the resulting ammonia synthesis gas stream is passed to ammonia synthesis at elevated pressure, and the ammonia synthesis effluent gas stream is cooled to condense and separate liquid ammonia, the improvement which comprises compressing the final gas mixture containing hydrogen, nitrogen and carbon dioxide to elevated urea and ammonia synthesis pressure, reacting the compressed gas mixture with said liquid amomnia under urea synthesis conditions, whereby carbon dioxide in said final gas mixture is converted to urea in a liquid phase and separated from the residual gas mixture, and passing the residual gas phase comprising hydrogen, nitrogen and ammonia vapor from urea synthesis to ammonia synthesis.*

*10. In an ammonia synthesis process in which a hydrocarbon is converted to produce a crude gas mixture principally containing hydrogen, nitrogen and carbon monoxide, the carbon monoxide in the crude gas mixture is converted to produce further hydrogen and carbon dioxide, thereby forming a final gas mixture principally containing hydrogen, nitrogen and carbon dioxide, the final gas mixture is processed to remove carbon dioxide, the resulting purified synthesis gas stream principally containing hydrogen and nitrogen is combined with residual ammonia synthesis effluent gas stream, the combined gas stream is reacted under ammonia synthesis conditions whereby an ammonia synthesis effluent gas stream containing synthesized ammonia vapor is produced, said ammonia synthesis effluent gas stream is cooled to condense synthesized liquid ammonia, and said synthesized liquid ammonia is separated from the residual gas stream comprising said residual ammonia synthesis effluent gas stream, the improvement which comprises*

*(a) compressing said final gas mixture principally containing hydrogen, nitrogen and carbon dioxide to urea and ammonia synthesis pressure,*

*(b) combining the compressed gas mixture from step (a) with at least a portion of said synthesized liquid ammonia and with aqueous ammonium carbamate solution,*

*(c) reacting the combined process stream from step (b) at urea and ammonia synthesis pressure whereby carbon dioxide in the combined stream is reacted with ammonia to form ammonium carbamate and a portion of the ammonium carbamate in the combined process stream is dehydrated to form urea,*

*(d) separating a mixed gas stream substantially free of carbon dioxide and comprising hydrogen, nitrogen and residual ammonia from the liquid urea synthesis effluent stream containing residual ammonium carbamate,*

*(e) combining the mixed gas stream from step (d) comprising purified synthesis gas stream principally containing hydrogen and nitrogen with said residual ammonia synthesis effluent gas stream,*

*(f) separating an aqueous ammonium carbamate solution and an aqueous urea solution from the liquid urea synthesis effluent stream derived from step (d), and*

*(g) recycling the aqueous ammonium carbamate solution derived from step (f) as said aqueous ammonium carbamate solution of step (b).*

*11. The process of claim 10, in which a stream of ammonia substantially free of carbon dioxide is also produced from the liquid urea synthesis effluent stream derived from step (d).*

References Cited

The following references, cited by the Examiner, are of record in the patented file of this patent or the original patent.

(Other references on following page)

UNITED STATES PATENTS

| | | | |
|---|---|---|---|
| 1,670,341 | 5/1928 | Casale | 260—555 |
| 1,937,116 | 11/1933 | Hetherington | 260—555 |
| 3,069,234 | 12/1962 | Cook et al. | 260—555 |
| 3,349,126 | 10/1967 | Hsu et al. | 260—555 |
| 3,310,376 | 3/1967 | Cook et al. | 260—555 |

FOREIGN PATENTS

| | | | |
|---|---|---|---|
| 27,434 | 1952 | Japan | 260—555 |

OTHER REFERENCES

Cline, J. E.: Manufacture of Urea: A Literature Survey Tennessee Valley Authority, Div. of Chem., Eng., Research & Engineering Branch, Report No. 646, Mar. 6, 1951, Wilson Dam, Ala., copy No. 12, pp. 8 and 9.

Webster's New International Dictionary of the English Language, 2nd edition, unabridged, Merriam Co. Publishers, Springfield, Mass., 1940, p. 560.

Cline, J. E.: Manufacture of Urea: A Literature Survey, T.V.A. Div. of Chem. Eng. Research & Eng., Branch Report No. 646, Mar. 6, 1951, Wilson Dam, Ala., copy No. 12, pp. 52, 78 and 79.

LEON ZITVER, Primary Examiner

M. W. GLYNN, Assistant Examiner

U.S. Cl. X.R.

23—199